United States Patent [19]

Richt

[11] 4,106,725

[45] Aug. 15, 1978

[54] DRIVE UNIT FOR MAGNETIC TAPE-RECORDERS

[76] Inventor: Oskar Hubert Richt, Buchenweg 14, Soecking, Fed. Rep. of Germany

[21] Appl. No.: 751,347

[22] Filed: Dec. 16, 1976

[51] Int. Cl.[2] .......................... G03B 1/04; G11B 15/32
[52] U.S. Cl. ....................................... 242/201; 360/74
[58] Field of Search ........................ 242/67.4, 200–206, 242/208–210, 191; 74/665 R, 665 L; 226/51, 108, 178, 188; 360/74

[56] References Cited

U.S. PATENT DOCUMENTS

| 3,235,193 | 2/1966 | Streets | 242/203 |
| 3,380,681 | 4/1968 | Baldwin, Jr. et al. | 242/203 |
| 3,621,149 | 11/1971 | Wada et al. | 242/209 |
| 3,630,469 | 12/1971 | Turgeon | 242/203 |
| 3,917,190 | 11/1975 | Richt | 242/191 |
| 4,009,846 | 3/1977 | Coruzzi | 242/201 |

Primary Examiner—Leonard D. Christian

[57] ABSTRACT

A drive unit for a magnetic tape recorder has two driving spindles, each with an associated drive wheel constantly connected to a reversible motor. Torque connections between the motor and spindles are automatically made and interrupted, respectively, upon reversal of motor rotation.

14 Claims, 7 Drawing Figures

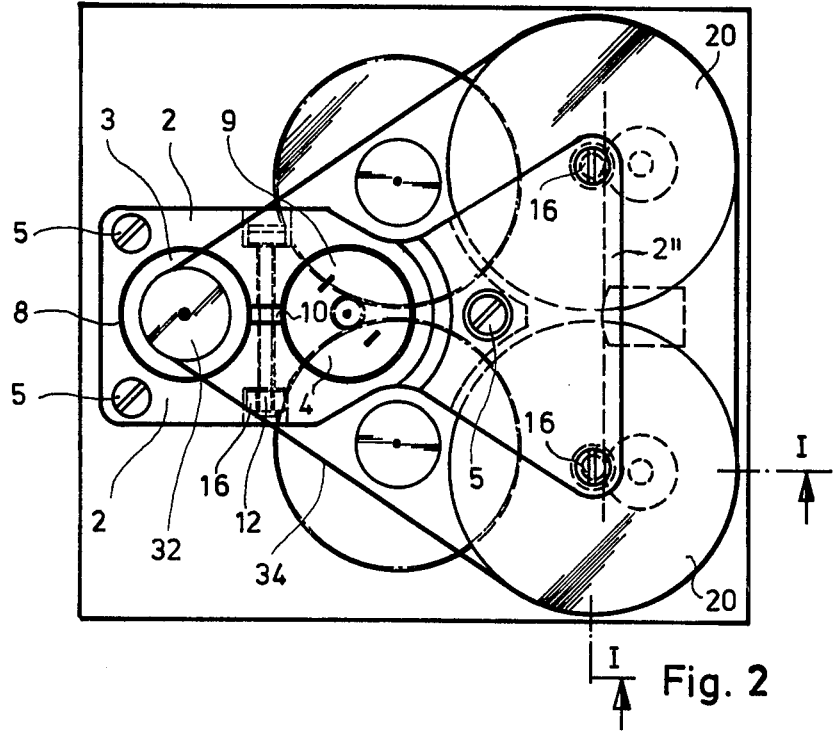
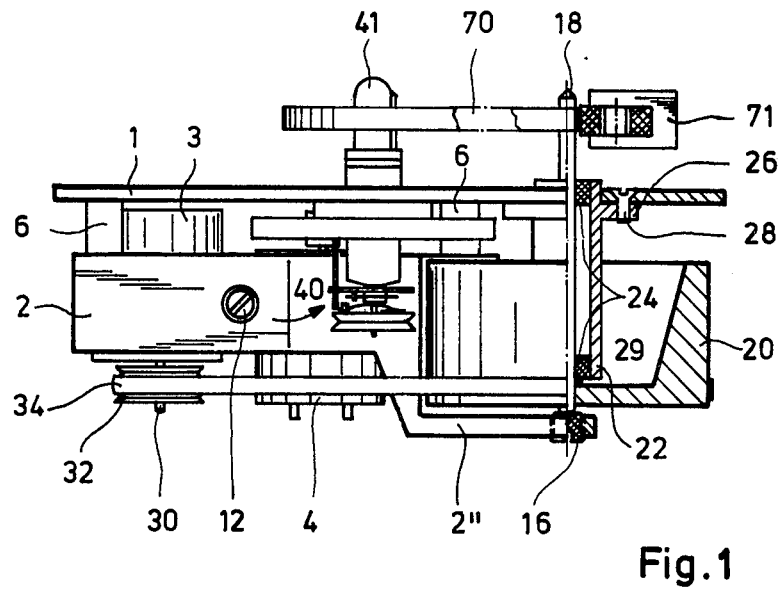
Fig. 2
Fig. 1

DRIVE UNIT FOR MAGNETIC TAPE-RECORDERS

The invention relates to a drive unit for a magnetic tape recorder.

As is well known, the winding of tapes in magnetic tape-recorders proceeds at varying speeds, the speed of the driven roll on which the tape is wound up normally remaining constant, whereas the idling roll from which the tape is unwound is normally slightly braked, and its speed adjusts itself according to the amount of tape remaining to be unwound. With magnetic tape-recorders which allow reversal of the direction of movement of the tape, it is therefore necessary to connect the drive motor alternatively to the two shafts, around which the rolls of tape is wound, by means of clutches, so that upon reversal of the direction of movement of the tape, the driving connection between the motor and the previously driven roll is interrupted and a driving connection between the motor and the previously idling roll is established. The simplest forms of such clutches are friction clutches, but other constructions are known wherein, upon reversing the direction of movement of the tape, the torque-transmitting connection between the drive motor and the shaft associated with the previously driven roll, is automatically interrupted. However, a disadvantage of these known constructions is that even when disengaged, the roll of tape remains connected to drive elements and possibly to a drive wheel on the shaft of the drive motor, and it is therefore affected by the friction losses and the inaccuracy in running of the drive unit. This has a disadvantageous effect upon the required high degree of synchronism in operation and therefore on the recordng and play-back quality of the magnetic tape-recorder.

One object of the invention is therefore to provide a drive unit for a magnetic tape-recorder, particularly of the cassette type, wherein the drive for the rolls of tape can be reversed simply by reversing the direction of rotation of the drive motor.

A further object is to provide a clutch, which is automatically actuated upon the reversal of the motor and which connects the roll that is to be driven to the drive motor and automatically and reliably interrupts the existing driving connection with the other roll.

Another object is to provide a drive unit whereby a high degree of synchronism can be met, but which can be produced in a simple manner and therefore inexpensively, particularly because of the use of identically designed parts associated with the two rolls of tape.

Yet another object of the invention is to combine the drive for the rolls of tape with a sound pick-up drive, which likewise enables the direction of movement of the tape to be reversed simply by reversing the direction of rotation of a drive motor.

A still further object of the invention is to provide on each shaft of a tape-winding means, an automatically actuating clutch, which, by means of a cam control, establishes a torque connection between the drive motor and the roll that is to be driven, on one direction of the motor, and interrupts the torque connection with the previously driven roll, the cam control being such that, at each momentary diameter of the roll of tape, interruption of the existing torque connection takes place more rapidly than the establishment of the new torque. This arrangement is intended to eliminate breakdowns.

A further object of the invention is that of so designing the drive unit that, if the tape begins to run in a faulty manner or after the tape has been completely wound off, movement of the tape is stopped or the direction of its movement is reversed. In the latter case automatic reversing is possible.

To achieve some or all of the above objects the invention provides a drive unit for a magnetic tape-recorder comprising two driving spindles for moving the magnetic tape, a drive wheel associated with each driving spindle, a single drive motor rotatable in two opposite directions and in constant driving connection with the two drive wheels, and respective clutch means between the each driving spindle and the associated drive wheel, each clutch means being effective automatically to establish a torque connection between the associated drive wheel and driving spindle when the motor rotates in a respective one of said directions and to interrupt such torque connection when the motor rotates in the other said direction.

To enable the invention to be better understood, an embodiment will now be described with reference to the annexed drawings, though the invention is in no way intended to be limited to this embodiment, which is given as an example only.

In the drawings:

FIG. 1 is a side view of a drive unit for a magnetic tape-recorder having separate motors for the rolls of tape and for the capstan shafts, this view being shown partly as a section drawn on the line I—I of FIG. 2;

FIG. 2 is an bottom view of the drive unit of FIG. 1;

Figure 3:
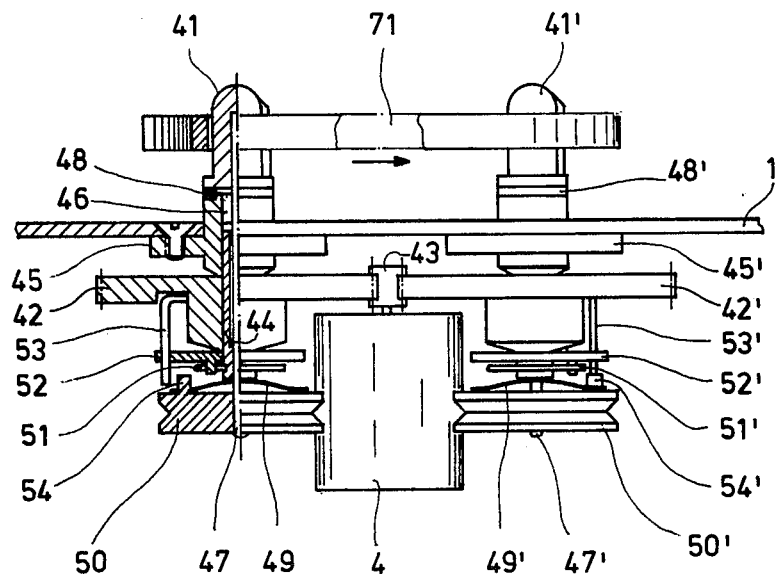
FIG. 3 is a detailed view, on a larger scale, of the unit for driving rolls of tape, this view being shown partly as a section drawn on the line III—III of FIG. 4.

The drive unit for a magnetic tape-recorder illustrated in FIGS. 1 and 2 to be contained in a housing, not illustrated, of the magnetic tape-recorder. It includes a plate 1 on which is secured, by means of screws 5, a support 2 for electric motors 3 and 4, the purpose of which will be described below. The correct position of the support 2 relative to the plate 1 is ensured by means of spacing sleeves 6 fitted around the screws 5. The support 2 is preferably an injection-moulded plastics part.

The support 2 has a rear portion 2' having two holes 8 and 9 accommodating electric motors 3 and 4 and which are interconnected by a connecting slot 10. As can be seen from FIG. 2, the rear portion 2' is traversed, in the zone of the connecting slot 10, by a clamping screw 12 carrying a nut 14; this screw exerting a clamping action on the electric motors 3 and 4 in the holes 8 and 9, sufficient for retaining the motors in the holes, the holder thus being a clamp.

The support 2 also has a front portion 2" which is horizontally spaced from the rear portion 2' and which is substantially in the form of a trapezoidal plate. Provided in this front portion 2" are adjustable axial bearings 16 in the form of screw-threaded plugs which serve as axial mountings for two capstan shafts 18. Fixedly connected to the capstan shafts 18 are rotary stabilizers 20 which, stabilize the rotary motion. The capstan shafts 18 are mounted against radial movement in bearing sleeves 22 having radial bearings 24. At its upper end each bearing sleeve 22 has a flange 26 by means of which it is secured, by screws 28, in a hold in the plate 1. Pressure rollers, shown in broken lines in FIG. 2, press the magnetic tape against the capstan shafts during recording and play-back, and co-operate with the two capstan shafts 18 in known manner.

The electric motor 3 is firmly fitted in the hole 8 in the rear portion 2' of the support 2. Its driving shaft 30 carries a belt pulley 32 to drive a belt 34 which extends around the outer peripheries of the rotary stabilizers 20 and of the belt pulley 32. The rotary stabilizers 20 and capstan shafts 18 are thus driven in the same direction as the electric motor 3 when the latter is operating.

To save space, the rotary stabilizers 20 are cupped and each has a recess 29 formed therein into which the bearing sleeve 22 extends.

Also secured to the plate 1 is a drive for the rolls of tape which is designated as a whole in FIG. 1 by the reference numeral 40 and can be more clearly seen in FIG. 3. This drive 40 consists primarily of a drive motor 4, firmly held in the hole 9 of the support 2, and two driving spindles 41 and 41', on which tape is rolled, with associated toothed drive wheels 42 and 42'. Since the driving spindles 41 and 41' and their associated drive devices are of identical form (with one exception to be described later) it suffices to describe the drive for the driving spindle 41. Parts associated with spindle 41' are given like reference numerals to those indicating parts associated with spindle 41, with the addition of an apostrophe.

The drive motor 4 is disposed between the drive wheels 42 and 42', and carries on its shaft a pinion 43 which meshes with the drive wheels 42 and 42' so that the latter are driven in the same rotary direction as indicated by arrows in FIG. 3. The drive wheel 42 is mounted to rotate freely on a sleeve 44, which is pressed into a bearing flange 45 attached to the plate 1 or is formed therein by moulding. The bearing flange 45 also contains a pressed in or moulded in bearing element 46, of plastics material which, together with the sleeve 44, forms a rotary bearing for a shaft 47 associated with the driving spindle 41. Provided on the upper end edge of the bearings flange 45 is a friction surface 48 against which the driving spindle 41 is urged by a spring 49 so as to brake the tape-winding action. The spring 49 is supported at one end against the bearing flange 45 via the sleeve 44, and at the other end on a disc 50 pressed on to the shaft 47.

The toothed drive wheel 42 is held against axial displacement by means of a spring clip 51 inserted in a recess in the sleeve 44. Between the spring clip 51 and the drive wheel 42, a cam disc 52 is rotatably mounted on the sleeve 44, which cam disc, in conjunction with a clutch lever 53 and a projection 54 projecting upwardly from the disc 50, forms the automatic clutch device.

Figure 5:
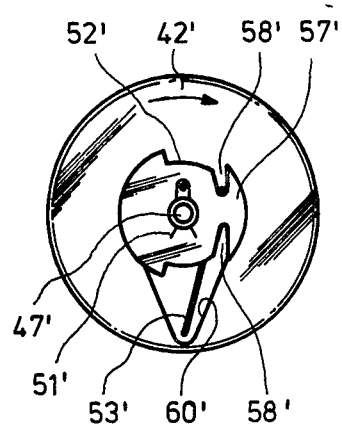
FIG. 5 is an underneath view of a single drive wheel and of the associated clutch device, seen in the direction of the arrow V in FIG. 3, this view showing the torque-transmitting position of a cam disc and of a lever forming part of the clutch device.

Further details regarding the form and mode of operation of the clutch device are described with reference to FIGS. 5 and 6 in which the coupling device for the drive of the driving spindle 41' is illustrated. The disc 50' is not illustrated in FIGS. 5 and 6 so as to make these Figures clearer. The cam disc 52' is substantially circular, but it has portion 56' of a radius greater than adjacent parts which is a stop and which has two radially extending stop surfaces on its periphery. Diametrically opposite the portion 56' is a mushroom-shaped formation 57' in which are defined two oppositely disposed notches 58'. The toothed drive wheel 42' has, in its lower face a recess 60' in the form of a segment of a circle centred near the edge of wheel 42'. The clutch lever 53' is mounted at the apex 61' of the recess 60' and is pivotable about an axis parallel to the axis of rotation of the drive wheel 42'. The recess 60' has stops 62' which limit the pivotal movement of the clutch lever 53'. As can be seen from FIG. 3, the clutch lever 53' has a downwardly bent arm which is of such length that, in the position of the clutch lever 53' shown in FIG. 5, its lower end lies in the path of movement of the projection 54' on the disc 50'. While when the lever 53' is pivoted to the position shown in FIG. 6 the lower end of lever 53' will not encounter the projection 54'.

Figure 4:
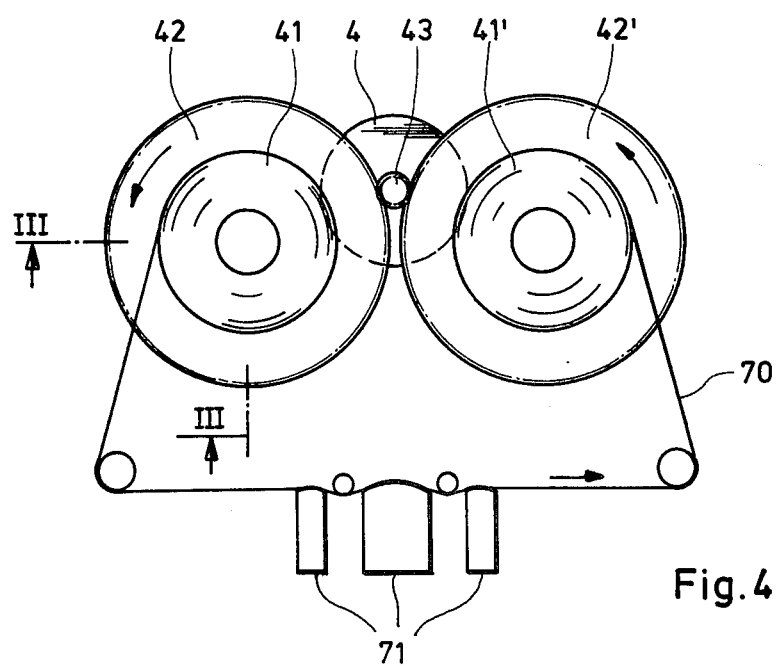
FIG. 4 is a plan view of the unit for driving the rolls of tape and as shown in FIG. 3, and wherein the capstan shafts and the magnetic heads are shown diagrammatically.

The mode of operation of the tape-winding drive just described is as follows:

If it is assumed that the drive motor 4 is turning and the drive wheels 42 and 42' are rotating in the direction as shown by the arrows in the plan view of FIG. 4, then a magnetic tape 70 on the driving spindle 41, is unwound therefrom, moves past a magnetic head 71 (shown only diagrammatically) in the direction indicated by the arrow, and is then wound on to the driving spindle 41'. For this purpose the spindle 41' must be driven, whereas the spindle 41 will rotate freely with its associated shaft 47. It will be seen from FIG. 5 that, for the given direction of rotation of the drive wheel 42', the downwardly bent arm of the clutch lever 53', rotating with the drive wheel 42', first slides around the circular periphery of the cam disc 52' before entering one of the notches 58'. This position is illustrated in FIG. 5. In this position the lower end of the downwardly projecting arm of the clutch lever 53' is located in the path of movement of the projection 54' so that upon further rotation of the drive wheel 42', the projection 54' is engaged and thus disc 50' and with it the shaft 47' and the driving spindle 41' are caused to rotate in the same direction.

As mentioned previously, apart from one exception, the drives for the two spindles 41 and 41' are identical. This exception consists in the fact that the free end of the clutch lever 53' is on the right-hand side of the shaft 47' associated with the driving spindle (as seen in the illustration of FIGS. 5 and 6) whereas the free end of the clutch lever 53 is on the opposite side (left-hand side) of the associated shaft 47. It will be understood from this that for the direction of rotation of the driving spindles 41 and 41' as shown in FIGS. 4 to 6, the downwardly projecting arm of the clutch lever 53 will not engage a notch 58 in cam disc 52 but, instead, will bear against the stop 56 on the cam disc 52 and is thus disposed outside the path of movement of the associated projection 54. The shaft 47 and the driving spindle 41 are thus not driven.

Figure 6:
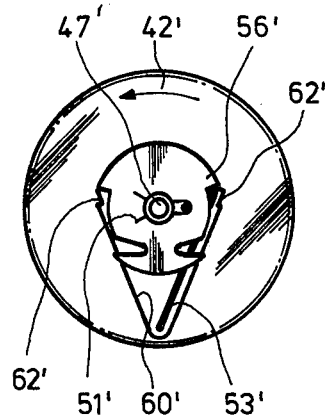
FIG. 6 is an bottom view similar to that of FIG. 5 and shows the drive wheel in the non-operative position of the cam disc and of the clutch lever.

In FIG. 6 the situation for the drive of the driving spindle 41' is illustrated in the case when the direction of rotation of the drive motor 4 has been reversed. Because of this reversal of direction, the downwardly projecting arm of the clutch lever 53' has moved out of the notch 58', while the cam disc 52' initially remains at rest because of the friction caused by the spring 51'. The downwardly projecting arm of the clutch lever 53' then slides over the circular outer edge of the cam disc 52' as far as the stop 56'. In this position it is disposed outside the path of movement of the associated projection 54' so that it then idles. Consequently, the driving spindle 41' together with its associated shaft 47' and the disc 50' fitted thereon can rotate without being influenced by any of the drive elements. It will be seen from this description of the mode of operation that the time required for disengaging the clutch lever 53 or 53' from the associated projection 54 and 54' respectively is considerably shorter than the time required for engaging this lever. Thus, reversal takes place in a more reliable manner.

Figure 7:
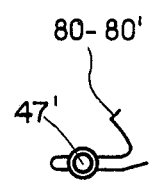
FIG. 7 illustrates a modified form of the cam shown in FIGS. 5 and 6.

Instead of the spring clips 51 and 51' the spring clips 80 and 80' illustrated in FIG. 7 can be used. The particular shape of these clips obviates the need for the cam discs 52 and 52' since each of the spring clips themselves form an equivalent notch, stop and cam track. Since the spring clips 80 and 80' are of asymmetrical shape, it is necessary to fit them opposite ways up on the associated tape-winding drives.

Advantages provided by the invention include the fact that, using simple and inexpensive components, an electrically controllable drive unit can be provided which, without the additional capstan shaft drive illustrated in FIGS. 1 and 2, is suitable for the recording and play-back of speech or for digital data recording. When the separate capstan shaft drive as shown in FIGS. 1 and 2 is included, the equipment is suitable for meeting stringent high-fidelity recording and reproducing requirements. The reversing operation of the sound pick-up shafts involved with movement of the tape in two directions is of equivalent high quality and can be controlled by simple electronic means, for instance by a signal derived from the drive motor 4. The electric and electronic circuitry required for this has not been shown in the drawings since it is familiar to any person skilled in the art. All components of the clutch device and of the capstan shaft drive are so designed that they can be used for both tape-winding drives and capstan shafts.

Preferably, the electric motors 3 and 4 are collector motors with ironless rotors which, because of their small mass, permit the direction of rotation to be reversed very rapidly. The belts 34 are preferably of the flat type. It will be understood that instead of the toothed-wheel drive between the drive motor 4 and the drive wheels 42 and 42', as used in the illustrated embodiment, use can also be made of other torque-transmitting means, e.g., a friction-wheel or belt drive.

I claim:

1. A drive unit for a magnetic tape-recorder comprising two driving spindles for moving the magnetic tape, a drive wheel associated with each driving spindle, a single drive motor rotatable in two opposite directions and in constant driving connection with the two drive wheels, and respective clutch means between each driving spindle and the associated drive wheel, each clutch means comprising a clutch lever pivotally mounted on the associated drive wheel and rotatable therewith, a cam disc cooperating with the clutch lever, the cam disc being rotatable relative to the drive wheel and defining two alternative pivotal positions for the lever, and a projection rotatable with the driving spindle and positioned so as to be engaged by the clutch lever when in only one of said pivotal positions, each clutch means being effective automatically to establish a torque connection between the associated drive wheel and driving spindle when the motor rotates in a respective one of said directions and to interrupt such torque connection when the motor rotates in the other said direction, and said cam disc being shaped so as to enable the clutch means to interrupt the existing torque connection to one spindle before establishing the torque connection to the other spindle.

2. A drive unit as claimed in claim 1, wherein said clutch lever is mounted in a recess in the associated drive wheel and is pivotable about an axis parallel to the axis of rotation of the drive wheel, an angled arm being provided on said clutch lever and arranged to engage the projection.

3. A drive unit as claimed in claim 2, wherein the recess is in the form of a segment of a circle to delimit the range of pivotal movement of the clutch lever.

4. A drive unit as claimed in claim 1 including common sleeves on which the drive wheels, and the associated cam discs and driving spindles are mounted.

5. A drive unit as claimed in claim 2, including a shaft for each driving spindle, a disc on said shaft, the projection being on the disc, and the associated drive wheel, clutch lever and cam disc being disposed between the driving spindle and the disc, the angled arm of the clutch lever extending beyond the cam disc to the projection.

6. A drive unit as claimed in claim 1, wherein the drive motor is a collector motor having an ironless rotor.

7. A drive unit as claimed in claim 1, and comprising a further drive motor, two capstan shafts, and pressure rollers which can be applied to the sound pick-up shafts.

8. A drive unit as claimed in claim 7, including a holder disposed between said two drive wheels, said drive motors being mounted one behind the other in said holder.

9. A drive unit as claimed in claim 7, wherein said two drive motors are mounted with their axes parallel to the axes of the driving spindles and of the capstan shafts.

10. A drive unit as claimed in claim 8, wherein the holder comprises a clamp.

11. A drive unit as claimed in claim 8, including axial bearings for the capstan shafts in said holder.

12. A drive unit as claimed in claim 7 including rotary stabilizers on said capstan shafts.

13. A drive unit as claimed in claim 10, wherein the clamp-holder is a plastics moulding and includes holes for accommodating the two drive motors, a further hole for receiving a clamping screw being provided between said holes.

14. A drive unit as claimed in claim 1, further comprising a base plate, each of said driving spindles and each of said associated drive wheels being rotatably journalled on the base plate, and each drive wheel being disposed coaxially with respect to its associated driving spindle.

* * * * *